United States Patent [19]

Ziegler et al.

[11] Patent Number: 5,020,741
[45] Date of Patent: Jun. 4, 1991

[54] AIRCRAFT PROPELLER WITH IMPROVED ELECTRICALLY DE-ICER LEADS

[75] Inventors: David E. Ziegler, Troy; Arthur J. Bowser, Fletcher, both of Ohio

[73] Assignee: Hartzell Propeller Inc., Piqua, Ohio

[21] Appl. No.: 447,410

[22] Filed: Dec. 7, 1989

[51] Int. Cl.[5] .............................. H05B 1/00
[52] U.S. Cl. .................... 244/134 D; 416/30; 416/39; 174/110 V; 174/119 R
[58] Field of Search .............. 416/30, 37, 39; 244/134 R, 134 D; 219/201, 202; 174/110 V, 113 C, 119 R

[56] References Cited

U.S. PATENT DOCUMENTS

| | | | |
|---|---|---|---|
| 2,454,874 | 11/1948 | Hunter | 244/134 D |
| 2,707,205 | 4/1955 | Abbott et al. | 174/110 V |
| 2,968,691 | 1/1961 | Canfield | 174/113 C X |
| 3,042,346 | 7/1962 | Hawley | 244/134 D |
| 3,644,703 | 2/1972 | Nelson | 219/201 |
| 3,657,514 | 4/1972 | Adams | 244/134 D X |
| 3,884,173 | 5/1975 | Fabula | 174/119 R X |
| 4,097,189 | 6/1978 | Harlamert | 416/46 |
| 4,230,899 | 10/1980 | Kanao | 174/119 R X |
| 4,650,402 | 3/1987 | Jones, Jr. et al. | 416/157 R |
| 4,699,568 | 10/1987 | Harlamert et al. | 416/95 |
| 4,743,712 | 5/1988 | Lee | 174/113 C |

Primary Examiner—Edward K. Look
Assistant Examiner—James A. Larson
Attorney, Agent, or Firm—Jacox & Meckstroth

[57] ABSTRACT

A multiple blade aircraft propeller hub has a bulkhead supporting concentric slip rings connected by slide blocks to the aircraft electrical system. Electrical conducting flexible leads connect the slip rings to electrical heating elements or de-icing boots carried by the propeller blades. Each of the leads includes an elongated flexible braided copper tube for conducting electricity and which loosely surrounds a flexible multiple strand stainless steel cable, and an extruded flexible vinyl insulating tube loosely surrounds the braided tube. The leads provide for minimizing stresses and metal fatigue in the electrical conducting braided tube with changes in blade pitch and thereby provide for a substantially extended service life.

15 Claims, 1 Drawing Sheet 5,020,741

AIRCRAFT PROPELLER WITH IMPROVED ELECTRICALLY DE-ICER LEADS

BACKGROUND OF THE INVENTION

In a propeller assembly including a propeller hub supporting a plurality of radially projecting adjustable pitch propeller blades, for example, of the general type disclosed in U.S. Pat. Nos. 4,097,189, 4,650,402, 4,699,568 and No. 4,904,157, it is common for the propeller blades to carry electrical heating elements or boots for preventing the build up of ice on the blades. Electrical power at a predetermined voltage, such as 28 Volts DC, is supplied to the electrical heating elements or boots mounted on the blades through concentric slip rings mounted on a radially disposed bulkhead secured for rotation with the propeller hub. The rotating slip rings contact non-rotating corresponding brushes, and the slip rings are electrically connected to the heating element or de-icing boot on each of the propeller blades by a pair of flexible wires or leads. The inner ends of each pair of leads include terminals which are releasably secured by screw fasteners to corresponding terminal blocks mounted on the forward face of the bulkhead, and a removable plug connects the outer ends of each pair of lead wires to a mating socket at the base portion of the propeller blade.

As the pitch of the propeller blades changes during operation of the aircraft, the leads extending from the slip rings to the propeller blades are required to flex. Commonly, the leads are each constructed of stranded copper wires tightly surrounded with an insulation material including multiple layers of braided cotton or synthetic fibers. Each pair of insulated copper wires may also be tightly covered with a tube of rubber or Neoprene insulation material. However, when these insulated copper wires flex with blade pitch changes, concentrated stresses and metal fatigue develope within the wires, with the result that at least a portion of the copper wires break after an extended period of use. Thus the wires or leads must be frequently inspected and tested and if wires are broken, must be removed and replaced with new leads, all of which adds to the down time of the aircraft and to the cost of maintaining the aircraft.

SUMMARY OF THE INVENTION

The present invention is directed to an aircraft propeller assembly which incorporates improved leads for connecting the aircraft power supply to the corresponding electrical de-icing elements or boots mounted on or carried by the propeller blades. The connecting leads of the invention provide for substantially increasing the flexibility of the leads without kinking and without metal fatigue so that the service life of the leads is substantially extended.

In general, the above features and advantages of the invention are provided by de-icer leads each of which incorporates, in accordance with a preferred construction, a flexible braided tube of fine copper wires for conducting the electrical current with a minimum electrical resistance. Each braided tube loosely surrounds a flexible stainless steel cable which provides the lead with substantial tensile strength and limits and controls the flexing of the braided tube. The braided tube is loosely surrounded by a flexible transparent tube of plastics or vinyl material which electrically insulates the braided tube and provides for quick and convenient visual inspection of the braided tube.

The corresponding end portions of each assembled co-extending cable and concentric tubes are crimped together by deforming sheet metal terminals which are releasably connected to the socket on the corresponding propeller blade and to the corresponding terminal block on the propeller bulkhead. The freedom for relative axial movement between the braided copper tube and the internal cable and between the transparent insulating tube and the braided tube provides for repetitive flexing of the current conducting braided copper tube with minimum stresses and metal fatigue. As a result, the need for periodically inspecting and/or replacing the de-icer leads is substantially reduced or eliminated.

Other features and advantages of the invention will be apparent from the following description, the accompanying drawing and the appended claims.

DESCRIPTION OF THE PREFERRED EMBODIMENT

Figure 1:
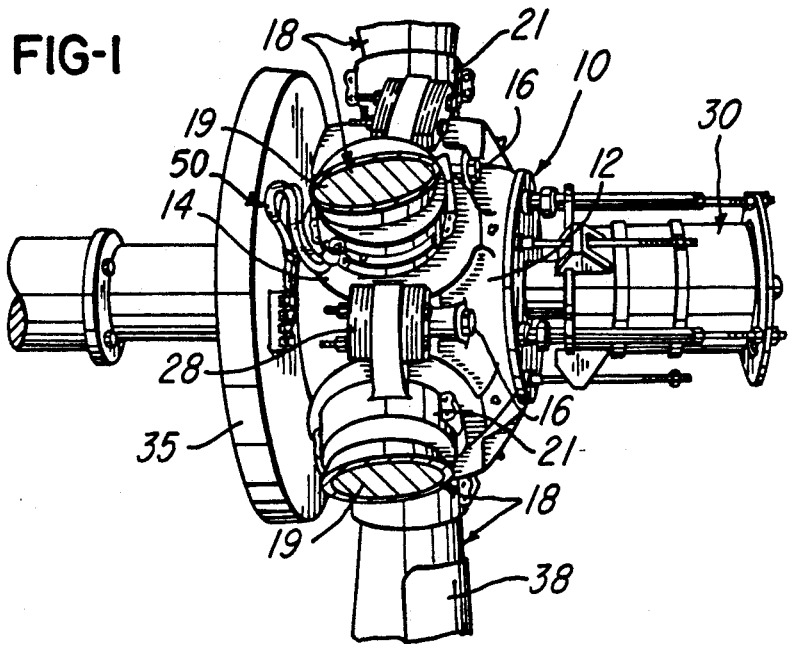
FIG. 1 is a perspective view of an aircraft propeller assembly with portions broken away and showing one pair of de-icer leads constructed in accordance with the invention.

The aircraft propeller assembly or propeller is shown in FIG. 1 supported by a test stand and is generally constructed in a manner as disclosed in above-mentioned Pat. Nos. 4,097,189 and 4,904,157, the disclosures of which are herein incorporated by reference. The propeller includes a hub assembly 10 formed by a forward hub section 12 and a rearward hub section 14 which are clamped together by a series of peripherally spaced bolts 16. A plurality of angularly arranged propeller blades 18 project radially outwardly from the hub assembly 10, and each blade 18 includes a base portion 19 which is retained by a pair of mating collar sections 21 surrounding an anti-friction thrust bearing (not shown) enclosed by the mating hub sections 12 and 14. The base portion 19 of each blade 18 is also supported for rotation by internal preloaded needle bearings (not shown) mounted on a tubular stub shaft projecting outwardly from the hub sections 12 and 14, as shown in above-mentioned Pat. No. 4,904,157. A counterweight member 28 projects from each pair of collar sections 21 for each propeller blade 18 and normally operates to rotate the blade towards a feather position when the propeller is rotating on the axis of the hub assembly 10 and engine drive shaft.

The hub assembly 10 also supports a hydraulically actuated blade pitch changing mechanism which includes a cylinder assembly 30 for simultaneously changing the pitch of the blades 18 between a feather position and a reverse position through high and low pitch positions. A detail construction for a typical hub assembly and pitch changing mechanism is disclosed in above-mentioned Pat. Nos. 4,097,189, and a typical construction for each propeller blade is disclosed in U.S. Pat. No. 4,407,635 which is also incorporated by reference. The hub assembly 10 and the base portion 19 of each propeller blade 18 and the blade pitch changing mechanism 30 are all enclosed within a removable cone-shaped spinner such as shown in Pat. No. 4,904,157. The rearward portion of the spinner is supported by a circular spinner bulkhead 35 which may be constructed from composite materials, such as the bulkhead disclosed in above-mentioned Pat. No. 4,699,568.

Each of the propeller blades 18 carries a de-icing heating element or boot 38 which is attached or bonded to the leading edge portion of the propeller blade by a suitable adhesive. One source for the de-icing heating elements or boots 38 is The B. F. Goodrich Company which markets the heating elements under the trademark HOT-PROP. A pair of electrical conducting wires (not shown) extend from each heating element 38 to a connection point located at the base of the blade and within a recess 42 (FIG. 2) formed within one of the retaining collar sections 21 for the blade.

Figure 2:
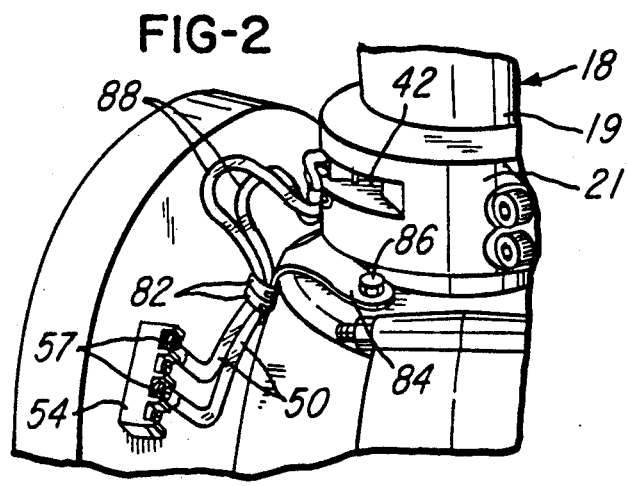
FIG. 2 is an enlarged fragmentary perspective view of the propeller assemnbly shown in FIG. 1 and illustrating the one pair of de-icer leads.
Figure 3:
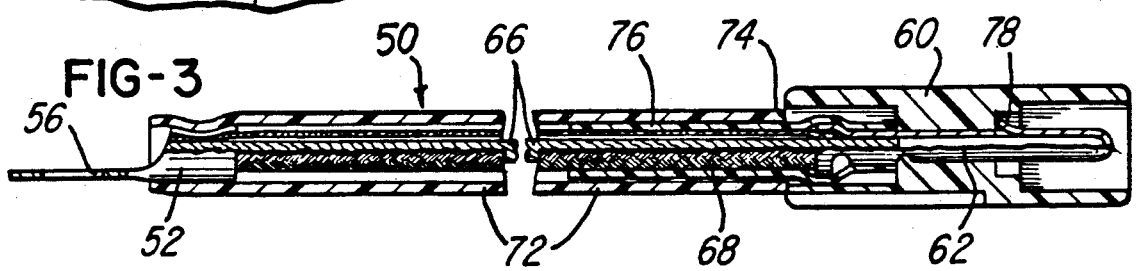
FIG. 3 is an enlarged axial section of a de-icer lead shown in FIG. 2 and with a center portion broken away.
Figure 4:
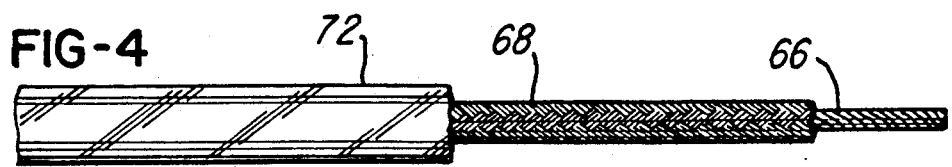
FIG. 4 is an elevational view of a portion of the de-icer lead shown in FIG. 3 and with end portions broken away to show the internal construction.

In accordance with the present invention, electrical power is supplied to each of the electrical heating elements or de-icing boots 38 by a pair of flexible leads 50 (FIGS. 2-4). Each of the leads 50 has an inner end portion connected by a formed sheet metal terminal 52 (FIG. 3) to a corresponding conductor post within a terminal block 54 mounted on the forward face of the bulkhead 35. The terminal 52 has a hole 56 for receiving a screw 57 threaded into the corresponding terminal post which extends through the block 54 and bulkhead 35 to a slip ring mounted on the rearward face of the bulkhead 35, for example, as shown in above-mentioned Pat. No. 4,699,568. The outer end portions of each pair of leads 50 connect with a molded plastic plug body 60 which supports a corresponding pair of formed sheet metal male conductor elements or prongs 62. The prongs 62 connect with a corresponding pair of female contacts (not shown) connected to the wires extending from the boot 38 when the plug body 60 is inserted into a mating socket located within the recess 42.

Each of the leads 50 includes a center stainless steel cable 66 (FIGS. 3 & 4) which preferrably has seven twisted strands each having seven twisted stainless steel wires. One source for the cable 66 is a 1/16" diameter stainless steel control cable sold by Van Dusen. Each of the leads 50 also includes a flexible electrical conducting tube 68 of braided tinned copper wire which is commercially available and commonly used for shielding an electrical conductor. One form of braided conducting tube 68 which has provided desirable test results is produced by New England Electric Wire Corporation in Lisbon, New Hampshire and sold under Part No. NEQ241036T.

Surrounding the braided conducting tube 68 of each lead 50 is a clear flexible electrical insulating tube 72 which is preferrably a section of an extruded plastics material having a polyvinyl chloride (PVC) base and capable of flexing at very low temperatures. One form of extruded vinyl tubing which has provided satisfactory test results is sold under the trademark TURBOZONE 40 and is distributed by Stranco Products, Inc. of Elk Grove Village, Illinois.

As shown in FIG. 3, the outer clear insulating tube 72 of each lead 50 has one end surface 74 which abuts the plastic plug body 60, and a short length of PVC tubing 76 extends into the outer insulating tube 72 and also into the plug 60 and around the base of the metal contact prong 62. Each of the prongs 62 within each plug 60 has an outwardly projecting barb 78 for retaining the prong within the molded plug body 60. As also shown in FIG. 3, the base or inner end portion of each prong 62 is crimped onto the end portion of the braided copper tube 68 and the corresponding end portion of the internal cable 66. At the opposite end of each lead 50, the base or inner end portion of the sheet metal terminal 52 is crimped onto the corresponding end portions of the braided tube 68 and the cable 66.

When each pair of leads 50 is installed on the aircraft propeller assembly, as shown in FIGS. 1 & 2, intermediate portions of each pair of leads 50 are attached by a pair of plastic band clamps 82 to the free end portion of a sheet metal support bracket 84 secured to the rear hub section 14 by a pair of bolts 86. This intermediate support of each pair of leads 50 by the bracket 84 is effective to confine the flexing of the leads 50 within the loops 88 (FIG. 2) between the bracket 84 and the corresponding propeller blade 18 when the blade changes pitch.

The copper braided tube 68 is free to move axially on the inner stainless steel cable 66 and is effective to conduct the electrical current with minimum resistance. The cable 66 will also conduct electricity, but has a much higher resistance than the braided copper tube 68. The clear vinyl tubing 72 is free to move axially on the braided copper tube 68. Thus when the leads 50 flex in response to changes in blade pitch, the copper wires forming the braided tube 68 are subjected to minimum stresses, which results in minimizing metal fatigue. The cable 66 within the braided tube 68 and the flexible vinyl tube 72 surrounding the braided tube 68 also help to prevent any sharp bending or kinking and overstressing of the braided tube 68. As a result, the service life of the leads 50 is substantially extended so that periodic replacement of the de-icer leads 50 is substantially eliminated. The clear insulating tube 72 also provides for visually inspecting the electrical conducting braided tube 68 without any disassembly to ensure that the tube is in good operating condition.

While the form of de-icer leads herein described constitutes a preferred embodiment of the invention, it is to be understood that the invention is not limited to this precise form, and that changes may be made therein without departing from the scope and spirit of the invention as defined in the appended claims. In addition, the no stress flexible leads 50 may have other applications wherever there is a requirement for electrically conducting wires or leads which are subjected to repetitive flexing over an extended period of time. For example, the construction of the leads 50 may be used to form static discharge "wicks" which are attached to the trailing edge portions of aircraft wings.

The invention having thus been described, the following is claimed:

1. A propeller assembly for use on an aircraft having an electrical power supply system, said assembly comprising a propeller hub, a plurality of angularly disposed adjustable pitch propeller blades supported by said hub, an electrical heating element carried by each said blade for de-icing said blade, means for conducting electricity from the aircraft power supply system to said heating elements, said conducting means including a plurality of elongated flexible leads, each of said leads having an intermediate portion connecting opposite end portions and including an elongated flexible element, a flexible braided tube of electrical conducting material surrounding said flexible element, said braided tube having sufficient clearance with said flexible element to provide for free axial movement of said braided tube on said flexible element along said intermediate portion of said lead in response to flexing of said lead, a flexible insulating tube of electrical insulation material surrounding said braided tube, and electrical connecting means for said opposite end portions of said leads and connected to said flexible element and said braided tube.

2. A propeller assembly as defined in claim 1 wherein said insulating tube of each said lead has sufficient clearance with said braided tube to provide for free axial movement of said insulating tube on said braided tube along said intermediate portion of said lead.

3. A propeller assembly as defined in claim 1 wherein said flexible element, said braided tube and said insulating tube have generally the same length.

4. A propeller assembly as defined in claim 1 wherein said insulating tube is substantially transparent to permit visual inspection of said braided tube.

5. A propeller assembly as defined in claim 1 wherein said flexible element comprises a cable having multiple twisted strands each having multiple twisted wires, and said connecting means secures opposite end portions of said braided tube to corresponding end portions of said cable.

6. A propeller assembly as defined in claim 1 wherein said electrical connecting means comprise metal terminals having base portions securing together corresponding end portions of said element and surrounding said braided tube.

7. A propeller assembly as defined in claim 1 wherein said insulating tube comprises a section of extruded clear polyvinyl chloride tubing.

8. A propeller assembly for use on an aircraft having an electrical power supply system, said assembly comprising a propeller hub, a plurality of angularly disposed adjustable pitch propeller blades supported by said hub, an electrical heating element carried by each said blade for de-icing said blade, means for conducting electricity from the aircraft power supply system to said heating elements, said conducting means including a plurality of elongated flexible leads, each of said leads having an intermediate portion connecting opposite end portions and including an elongated non-stretchable flexible cable having multiple twisted strands each having multiple twisted wires, a flexible braided tube of electrical conducting material surrounding said cable, said braided tube having sufficient clearance with said cable to provide for free axial movement of said braided tube on said cable along said intermediate portion of said lead in response to flexing of said lead, a flexible insulating tube of electrical insulation material surrounding said braided tube, and electrical connecting means for said opposite end portions of said leads and connected to said cable and said braided tube.

9. A propeller assembly as defined in claim 8 wherein said insulating tube of each said lead has sufficient clearance with said braided tube to provide for free axial movement of said insulating tube on said braided tube along said intermediate portion of said lead.

10. A propeller assembly as defined in claim 8 wherein said insulating tube is substantially transparent to permit visual inspection of said braided member.

11. An improved elongated flexible lead adapted for use on an aircraft, said lead comprising an elongated non-stretchable flexible cable having multiple twisted strands each having multiple twisted wires and providing for a limited degree of flexibility, a flexible braided tube of electrical conducting material surrounding said cable, said braided tube having sufficient clearance with said cable to provide for free axial movement of said braided tube on said cable along the length of said cable in response to flexing of said lead, a flexible insulating tube of electrical insulation material surrounding said braided tube, and means connected to said braided tube for conducting electricity.

12. A flexible lead as defined in claim 11 wherein said insulating tube has sufficient clearance with said braided tube to provide for free axial movement of said insulating tube on said braided tube along the length of said braided tube.

13. A flexible lead as defined in claim 11 wherein said twisted wires of said cable comprise stainless steel wires.

14. A flexible lead as defined in claim 11 wherein said flexible braided tube comprises braided copper wires.

15. A flexible lead as defined in claim 11 wherein said insulating tube is substantially transparent to permit visual inspection of said braided tube.

* * * * *